Aug. 16, 1960
D. EOLKIN
2,949,027
CONTINUOUS DENSITOMETER
Filed July 18, 1955
2 Sheets-Sheet 2
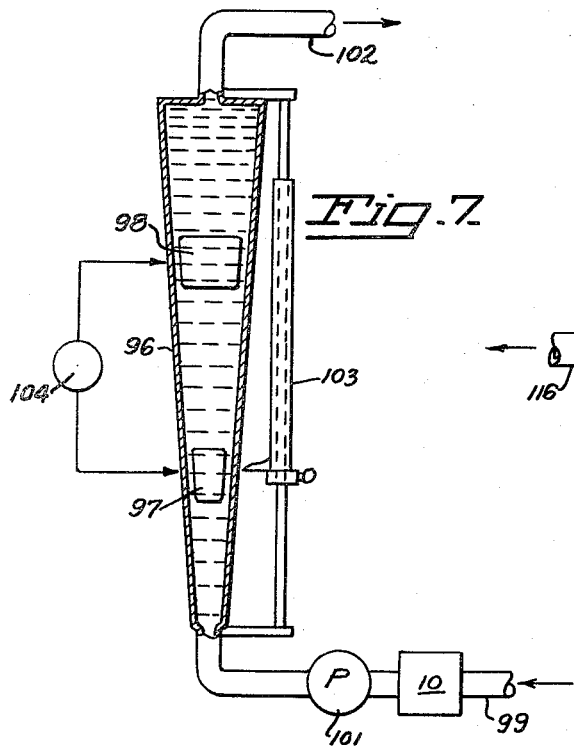
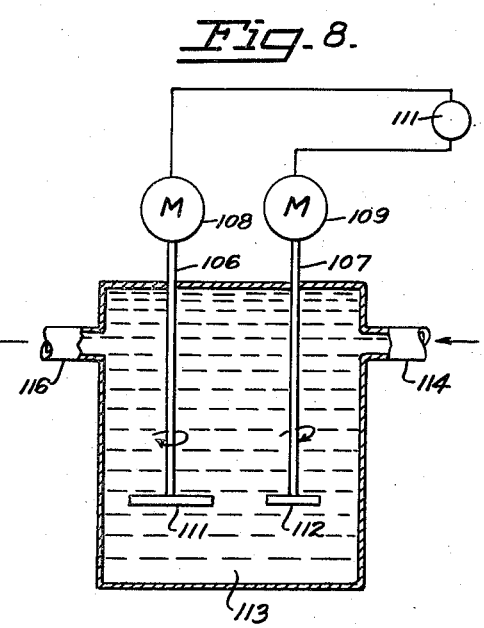
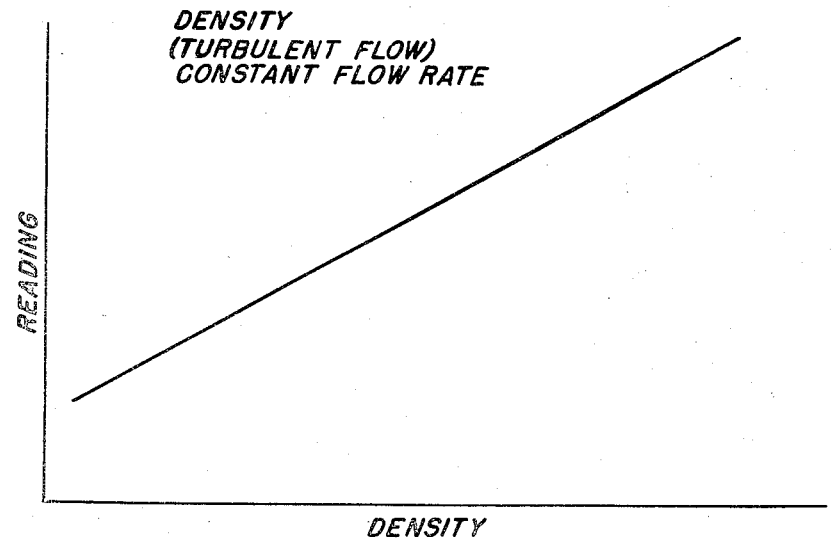
INVENTOR.
DAVE EOLKIN
BY
Townsend, Townsend and Hoppe
ATTORNEYS United States Patent Office 2,949,027
Patented Aug. 16, 1960

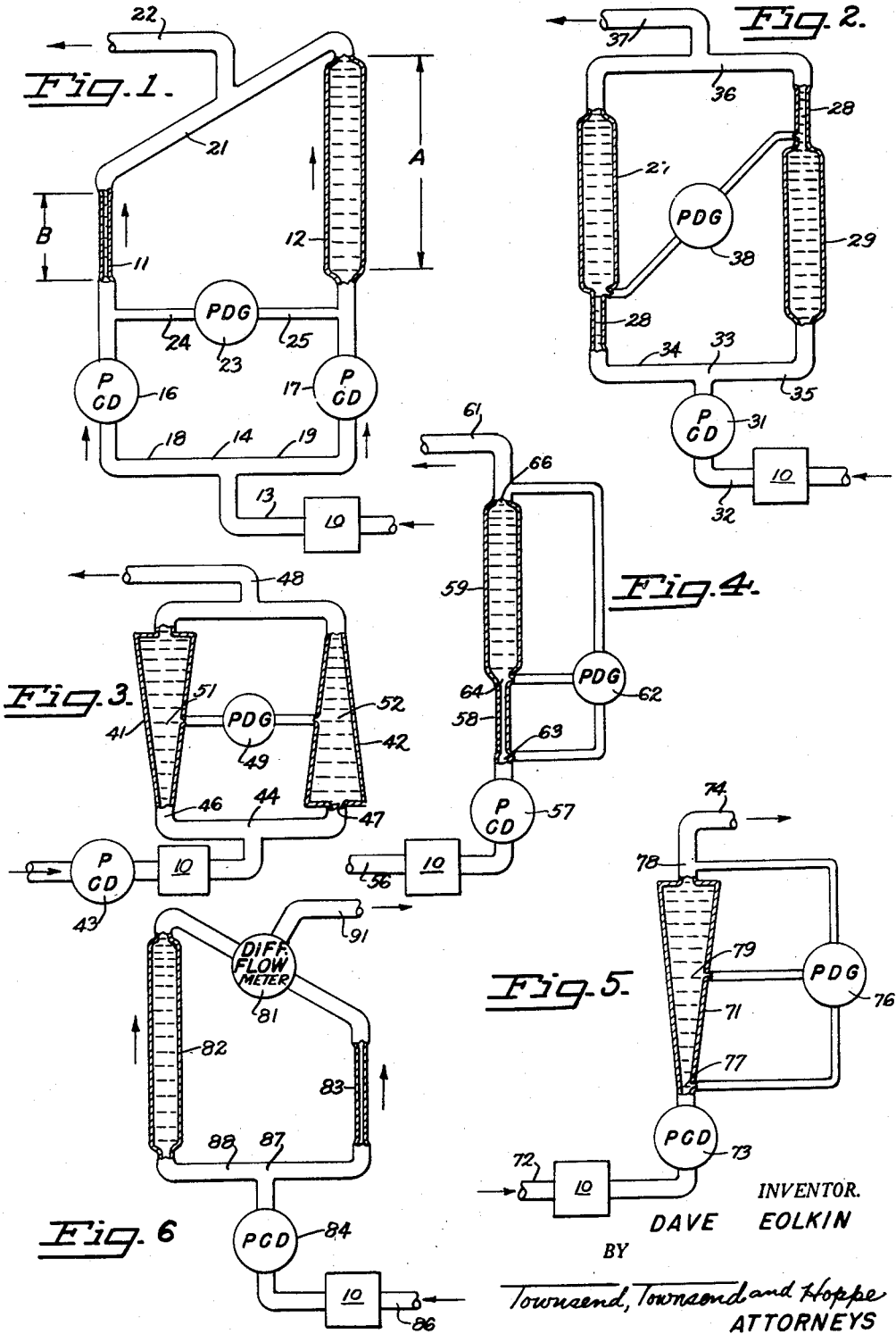

2,949,027
CONTINUOUS DENSITOMETER

Dave Eolkin, San Lorenzo, Calif., assignor to Gerber Products Company, Fremont, Mich., a corporation of Michigan Filed July 18, 1955, Ser. No. 522,669

22 Claims. (Cl. 73—32)

This invention relates to a new and improved continuous densitometer. The invention relates to densitometric measurements of industrial products, such as pureed and formulated foods, where it is desirable, from the standpoint of manufacturing controls, to obtain readings and to control the density of the product so that standards of uniformity may be maintained. Reference is made to my co-pending patent applications Serial No. 431,441, filed May 21, 1954, on Continuous Consistometer and Method of Measuring and Controlling Liquiform Product Consistency Continuously, and Serial No. 487,752, filed February 14, 1955, on Continuous Viscosimeter.

For the purpose of this invention, liquids may be classified in two types—namely, Newtonian liquids and non-Newtonian liquids. A Newtonian liquid may be defined as one in which the viscosity does not vary with the rate of shear within the non-turbulent flow range, whereas a non-Newtonian liquid is one in which the viscosity is variable with the rate of shear in the non-turbulent flow range. Newtonian liquids comprise such materials as water, gasoline, glycerin, mineral oils, etc., whereas non-Newtonian liquids comprise food purees, starch jells, lubricating greases, printing inks, clay suspensions, paints, etc. In the latter types of liquids, when viscosity is plotted as a function of rate of shear, a curve is produced rather than a straight line. When viscosity of Newtonian liquids is plotted as a function of rate of shear, a straight line is produced. The "rate of shear" is a concept which may be defined as follows: Let it be assumed that there are two parallel planes of infinite length A and B, spaced apart a distance "bd," the intervening space being filled with the liquid under test. A tangential shearing stress is applied parallel to plane A immediately adjacent plane A. The A plane then moves with respect to B, carrying with it the innumerable parallel planes of liquid existing between A and B. Each plane, however, is carried a different distance, the top plane A moving farthest with respect to the bottom plane B, which remains stationary. When point "b" in the the A plane reaches point "c," after the shearing stress is applied for a given interval the distance between b and c divided by the time interval gives the velocity of A with respect to B. The distance bc divided by the distance bd (the distance between the two planes) becomes the rate of shear. This is customarily written as $$\frac{dv}{dr}$$

where $v$ is velocity and $r$ is the distance between the planes. The foregoing definition is based upon "Industrial Rheology and Rheological Structures" by Harry Green, John Wiley & Sons, Inc., 1949. The definition of other terms used in this description of this invention will be based in large part upon that work.

For the purpose of the present invention, Newtonian liquids are measured. Non-Newtonian liquids may also be measured, but scale readings for such liquids must be made on an empirical basis for the particular liquid involved.

In the hereinafter described method and apparatus, measurements are made of liquids at different rates of shear, the instrument being so designed and so constructed that by taking measurements at different rates of shear, the density of the product may be determined. In making these measurements, the liquid is caused to flow from a tube of one diameter to a tube of a different diameter. Kinetic energy changes occur upon passage of the fluid from a tube of one diameter to a tube of a different diameter. These kinetic energy losses can be measured by measuring the pressure differential before and after the passage. The general expression for kinetic energy is as follows:

$$K.E. = \frac{1}{2}Mv^2$$

wherein M is the mass of material and $v$ is the velocity of the material. Assuming that the velocity of the material is kept constant or suitable adjustment is made for differences in velocity of material, a network of tubes is provided as hereinafter explained, which eliminates viscosity factors by reason of its symmetricity. Accordingly, the pressure differential at two points in the system will be a direct function of the mass of material flowing. Inasmuch as density is equal to the mass per unit of volume, if it be assumed that the volume is maintained constant or that suitable adjustment is made for variations in volume, then if the density of the fluid changes the kinetic energy losses upon passage from a tube of one diameter to a tube of a different diameter are a direct function of change in density of the fluid. This principle is employed in the apparatus and method hereinafter described in detail.

In practice, the maintenance of a constant volume of flow is impractical. However, either the flow rate can be adjusted by means of a flowmeter or the flow rate can be noted on a flowmeter. Accordingly, either the densitometer may be automatically corrected for flow shifts by suitable linkage to the flowmeter or the densitometer reading may be corrected for change in flow as recorded on the flowmeter. The term "effectively constant flow" is used herein to designate the foregoing concept.

It is possible to measure the density of a non-Newtonian fluid by using a flow rate sufficiently high to produce turbulence. Here again turbulent flow conditions cause energy losses which are primarily kinetic in nature and are, therefore, a function of velocity and mass.

Another feature and advantage of the invention is the fact that by increasing the shear ratio or increasing the difference in diameter between the large tube and the small tube, the sensitivity of the apparatus to density changes is increased.

Another feature of the invention is that by adjustment of length of the tubes, optimum utilization of the differential in pressure may be accomplished. By adjusting the tubing length, the gauge may be set for zero on certain types of fluids, such as water. Hence by proper adjustment of tube length, the sensitivity to density variations may be increased.

Other objects of the present invention will become apparent upon reading the following specification and referring to the accompanying drawings in which similar characters of reference represent corresponding parts in each of the several views.

In the drawings:

Figs. 1–8, inclusive, are schematic views of various modifications of continuous densitometers, the exact details of which are hereinafter described; and Fig. 9 is a schematic graph showing a straight line function of density plotted against reading of the pressure differential gauge of the apparatus for constant rate turbulent flow.

In Fig. 1, two capillary tubes 11 and 12 of different lengths and diameters are shown. The product entering through pipe 13 branches at T 14 and is pumped by two constant-volume pumps 16 and 17 of identical capacity through branches 18 and 19 in which are installed the tubes 11 and 12, respectively, the discharge from the branches being brought together through conduit 21 and discharged through pipe 22. Although not essential to the invention, it is desirable that the diameters and lengths of the two tubes 11 and 12 be such that if the fluid passing therethrough were a Newtonian fluid, the viscous resistance of each tube would be identical. Thus, the viscous resistance on the shorter tube 11 being greater per inch of length than in the longer tube 12, the relative lengths are adjusted so that the total resistances are equal. A pressure differential gauge 23 is installed with leads 24 and 25 to the bases of the two tubes 11 and 12. Assuming that the fluid were a Newtonian fluid and that flow were turbulent, then the pressure gauge 23 would show kinetic energy losses in the tubes. Change in density or flow rate will be indicated by changes in pressure gauge reading. It is also assumed that the flow through each branch is turbulent so that the kinetic energy losses in changing from one size conduit to another are of paramount importance as compared with the viscous resistance losses. Inasmuch as the flow and velocity through each branch is constant, as has been set forth earlier in the specification of this invention, changes in density of the product vary the kinetic energy losses and hence the gauge 23 indicates any change in density of the fluid flowing through the pipe 13. Change in the reading of gauge 23 indicates to the attendant that change in the density of the product has occurred, requiring adjustment of the processing conditions.

In Fig. 2 a different arrangement of capillary tubes is shown, although the result is substantially the same. On one side of the device are two tubes 26 and 27 joined end to end, tube 26 being of small diameter and the tube 27 of larger diameter. The corresponding tubes 28 and 29 on opposite sides are identical, but reversed in position. The diameters and lengths of the tubes are such that the viscous resistance for a Newtonian liquid in small tube 26 or 28 would equal that in large tube 27 or 29. A single constant volume pump 31 is employed in the system shown in Fig. 2, the fluid entering through pipe 32 being pumped through pump 31 and divided at T 33 to flow equally through the two branches 34 and 35 having identical viscous resistances and joined together at the outlet 36 and carried off by discharge pipe 37. A pressure differential gauge 38 is installed to compute the difference in pressure between the top of the small tube 26 on one side and the top of the large tube 29 on the other side. Here again, during turbulent flow, a change in density is indicated by a change in pressure differential.

In Fig. 3, two identical tapered capillary tubes 41 and 42 are employed, the two tubes being reversed in direction. A single constant-volume pump 43 is employed and the discharge of the pump is divided at T 44 equally into the two branches 46 and 47 and the discharge from the tapered tubes 41 and 42 is brought together and discharged through a single pipe 48. A pressure differential gauge 49 is installed to measure the pressure at the median viscous resistance points 51 and 52 in the two tubes (assuming that Newtonian fluids were flowing therethrough).

Heretofore, in Figs. 1 to 3, inclusive, two branches have been employed into which the flow is divided, the volume of flow through each branch being identical. In Fig. 4, a single line of flow is employed. The fluid enters through pipe 56 and is pumped by pump 57, first through small diameter capillary tube 58 and thence through large diameter capillary tube 59, the tubes 58 and 59 being connected end to end, and thence out through pipe 61. A pressure differential gauge 62 is employed which measures the difference in the pressure differentials between points 63 (at the bottom of tube 58) and 64 (at the connection between tubes 58 and 59) and between points 64 and 66 (at the top of tube 59). The diameters and lengths of the capillaries 58 and 59 are such that for Newtonian fluids the viscous resistance of the two tubes is equal, it being understood that this is a desirable but not essential feature of the invention.

In Fig. 5 a single flow is employed but a tapered capillary 71 is used. Thus, the fluid is pumped from conduit 72 by pump 73 through the tapered tube 71 and is discharged through pipe 74. A pressure differential gauge 76 is employed which is connected to three points: namely, point 77 at the bottom of the tube, point 78 at the top of the tube and point 79 at the median viscous resistance point for a Newtonian fluid.

In the modification of Figs. 1 to 5, inclusive, the density has been measured by measurement of difference in pressure. In Fig. 6 a differential flowmeter 81 is employed which measures the difference in flow. Thus, capillaries 82 and 83 are employed, it being desirable, though not essential, that the diameters and lengths of the tubes 82 and 83 be such that the viscous resistance through each is identical for a Newtonian fluid. Constant volume pump 84 draws product from pipe 86 and flow is divided at T 87 into two branches 88 and 89, one of the two tubes 82 and 83 being in each branch. The discharge of the tubes passes through flowmeter 81 and out through pipe 91. For a Newtonian fluid, the viscous resistance of the two capillaries 82 and 83 being identical, the flow through each branch 88 and 89 will be identical. The differential flowmeter 81 indicates a difference in density of the fluid flowing through the branches.

The apparatus shown in Fig. 7 differs somewhat from that shown in the previous illustrations. A tapered tube 96 is employed and within the tube are two floats 97 and 98 having different weights. The material entering through pipe 99 is pumped by constant volume pump 101 upwardly through the tube 96, and out through the discharge 102. Float 97 is in a different rate of shear zone than float 98 so that as density of the product changes, the distance between the floats 97 and 98 changes. The height of the respective floats may be read on a height gauge 103, or the distance between the two floats may be measured electrically, as indicated generally by electric gauge 104, as is well understood in this art. The two floats are similar in shape and are of a shape such that they are sensitive to changes in viscosity. It will be apparent that instead of single tube 96, two separate tubes may be employed (as in Fig. 3) with a float in each tube.

In Fig. 8, a rotational, as distinguished from a capillary, measurement is employed. Two spindles 106 and 107 are driven by motors 108 and 109, the spindles terminating in disks 111 and 112 immersed in a tank 113 connected with the moving stream of fluid entering through pipe 114 and leaving through pipe 116. The two disks 111 and 112 are of different diameters and the two motors 108 and 109 are driven at different speeds, the relationship of the diameters and speeds desirably being such that for a Newtonian liquid the viscous drag on the two spindles is identical. The viscous drag on the spindles is measured by instrument 111$^a$ and converted into an electrical impulse, as is well understood in the art. Differences in drag indicates differences in density of fluid. The rotating member may be, in addition to a disk, a cup, cone, or other element which accurately responds to the viscous drag of the fluid.

By any of the apparatuses heretofore described a change in density of product continuously passing through the pipe is immediately indicated and by gauge calibration its magnitude may be similarly indicated. The information thus obtained may be used to insure proper continuous density of the product.

In the various systems which have been described heretofore, it is essential that the flow be continuously controlled or that auxiliary means for determining the flow may be employed. Such flowmeter or flow controller is indicated in the accompanying drawing by reference numeral 10.

The graph, Fig. 9, illustrates that the reading obtained on the various gauges heretofore described in connection with each of the modifications of Figs. 1–8, inclusive, is directly proportional to the density of the product, provided that (a) the product is a Newtonian fluid; (b) that the flow through the system is turbulent, and (c) that the flow rate is constant.

In the accompanying claims the term "zone" is used as more precise than the term "point" commonly used in the art. The word "zone" will be understood to mean a volume of space within the confines of the densitometer apparatus in which fluid conditions are such that the rate of shear stands at one value, as compared with another volume of space in the apparatus in which the rate of shear value is different.

Although the foregoing invention has been described in some detail by way of illustration and example for purposes of clarity of understanding, it is understood that certain changes and modifications may be practiced within the spirit of the invention and scope of the appended claims.

What is claimed is:

1. A continuous densitometer comprising a conduit through which a fluid flows, means for flowing fluid through said conduit, means for establishing effectively constant flow through said conduit, first means in said conduit establishing at least two zones of different rates of shear in the flow of fluid, said first means being dimensioned whereby flow of fluid is turbulent in both said zones, said zones being of different length, and means for measuring the flow resistance of the fluid in said different zones.

2. A continuous densitometer according to claim 1 in which said zones are established in different branches of flow.

3. A continuous densitometer according to claim 2 in which said second means comprises means for measuring the difference in flow through the two branches.

4. A continuous densitometer according to claim 1 in which said first means comprises capillary tubes through which said fluid passes.

5. A continuous densitometer according to claim 1 in which said zones are established at different locations in a single line of flow.

6. A continuous densitometer comprising a conduit through which a fluid flows, means for flowing fluid through said conduit, means for establishing effectively constant flow through said conduit, means in said conduit establishing at least two zones of different rates of shear in the flow of fluid and turbulent flow of fluid at said zones, said last-mentioned means comprising rotatable members of different diameters and means for revolving said members at different speeds of rotation, and means for measuring the shear resistance of said rotatable members in said different zones.

7. A continuous densitometer comprising an intake conduit, a first and a second branch leading from said intake conduit, a first capillary tube in said first branch, a second capillary tube in said second branch, said tubes being of different diameters, pressure means for flowing at turbulent flow an effectively constant flow of fluid through each said branch, a pressure differential gauge for measuring the difference in pressure in said first and second tubes, and a discharge conduit collecting the discharge of both said branches.

8. A densitometer according to claim 7 in which is further provided a third capillary tube in said first branch behind said first tube identical with said second tube and a fourth capillary tube in said second branch behind said second tube identical with said first tube.

9. A densitometer according to claim 7 in which said tubes are identically tapered tubes mounted in opposite directions and said gauge means is connected to each of said tubes intermediate the ends thereof.

10. A continuous densitometer comprising an intake conduit, a pump in said conduit, means for establishing effectively constant turbulent flow through said conduit, a first capillary tube behind said last named means, a second capillary tube behind said first capillary tube, said capillary tubes being of different diameters, a discharge conduit behind said second capillary tube, and a pressure differential gauge for measuring the difference in pressure between the intake of said first tube, the point of juncture of said tubes, and the discharge of said second tube.

11. A continuous densitometer comprising an intake conduit, means for establishing effectively constant turbulent flow through said conduit, a tapered capillary tube, a discharge conduit, and a gauge for measuring the difference in pressure between the bottom of said tube, a point intermediate the ends thereof, and the top of said tube.

12. A continuous densitometer comprising a tapered capillary tube, means for establishing effectively constant turbulent flow through said tube, a first weight, a second weight, said weights being of different mass, and being subject to differences in density of fluid, and means for measuring the differences in distance between said weights.

13. A continuous densitometer comprising a branch of flow having a plurality of zones of different rates of shear, at least two weights of different mass, said weights being free to move throughout said zones, means for pumping fluid at substantially constant turbulent flow through said branch, and means for measuring the differences in distance between said weights.

14. A continuous densitometer comprising means defining a chamber, means for filling said chamber continuously with fluid under test at turbulent flow, a pair of rotatable members rotatable in said chamber, said members being of different diameters, means for separately rotating each of said members at a rotational speed to provide turbulence at the interface of said members and the fluid in said chamber, and means for measuring the difference in rotational resistance of said members.

15. A continuous densitometer comprising means defining a chamber, means for filling said chamber continuously with fluid under test at effectively constant flow, a first member, a first spindle on which said first member is mounted, a first motor arranged to drive said first spindle at a rotational speed to provide turbulence at the interface of said first member and the fluid in said chamber, a second member of different diameter from said first member, a second spindle on which said second member is mounted, a second motor arranged to drive said second spindle at a rotational speed to provide turbulence at the interface of said second member and the fluid in said chamber, and means for measuring the differences in rotational resistance of said motors.

16. The method of continuously measuring the density of fluids comprising establishing and maintaining a fluid stream of fluid having at least two zones through which the fluid flows continuously at effectively constant turbulent flow, the rate of shear at the two zones being different, establishing and maintaining fluid communication between each of said zones and points remote from said zones and measuring at said points remote from said zones the differences in viscous resistance in at least two said zones.

17. The method of claim 16 accomplished by separately sensing the pressure of the fluid at each of said zones while said fluid is flowing through said zones and is subject to viscous resistance in said zones measuring the difference in pressure at the two zones.

18. The method of claim 16 which further comprises dividing the flow of fluid into two branches, and establishing one said zone in each said branch.

19. The method of claim 16 in which said measuring is accomplished by measuring the difference in rate of flow through said branches.

20. The method of claim 16 in which the measuring is accomplished by suspending weights in said fluid stream at the two zones and balancing said weights by the shear reaction of weights to the fluid passing the weights and the buoyancy of the fluid and by measuring the difference in weight which can be supported at said two zones.

21. The method of claim 16 in which said zones are established in a series of fine gradations of increasing resistance and said measuring is accomplished by suspending weights in said fluid stream at two of said zones and balancing said weights by the shear reaction of the fluid passing the weights and the buoyancy of the fluid and by measuring the distance between the zones at which weights of different mass are held in equilibrium.

22. The method of continuously measuring the density of fluids comprising establishing and maintaining a fluid stream of fluid having at least two zones through which the fluid flows continuously at effectively constant turbulent flow, establishing and maintaining fluid communication between each of said zones and points remote from said zones, suspending a pair of rotatable elements in said fluid, one at one zone and one at the other, said rotatable elements having different viscous resistance relative to said fluid, rotating said rotatable elements at speeds to produce turbulence at the interfaces of said elements and said fluid, and measuring the difference in resistance to rotation of said rotatable elements at said two zones.

References Cited in the file of this patent

UNITED STATES PATENTS

| 2,360,546 | Cardwell | Oct. 17, 1944 |
| 2,437,247 | Fischer | Mar. 9, 1948 |
| 2,700,891 | Shafer | Feb. 1, 1955 |
| 2,800,019 | Rumble | July 23, 1957 |

FOREIGN PATENTS

| 1,083,782 | France | June 30, 1954 |